US008330891B2

(12) United States Patent
Shiao et al.

(10) Patent No.: US 8,330,891 B2
(45) Date of Patent: Dec. 11, 2012

(54) ACTIVE ARRAY SUBSTRATE FOR FLAT PANEL DISPLAY

(75) Inventors: Tsung-Jieh Shiao, Hsin-Chu (TW); Tien-Chun Huang, Hsin-Chu (TW); Shou-Lie Liu, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 655 days.

(21) Appl. No.: 12/216,938

(22) Filed: Jul. 14, 2008

(65) Prior Publication Data

US 2009/0021665 A1 Jan. 22, 2009

(30) Foreign Application Priority Data

Jul. 16, 2007 (TW) ................................ 96125846 A

(51) Int. Cl.
*G02F 1/13* (2006.01)
*G02F 1/1333* (2006.01)
*G02F 1/1343* (2006.01)

(52) U.S. Cl. ............................ 349/54; 349/139; 349/192
(58) Field of Classification Search .................... 349/54, 349/192
See application file for complete search history.

(56) References Cited

U.S. PATENT DOCUMENTS

| 5,969,779 | A | * | 10/1999 | Kim et al. | ......................... | 349/54 |
| 6,111,621 | A | * | 8/2000 | Kim et al. | ......................... | 349/54 |
| 7,609,246 | B2 | * | 10/2009 | Hsu et al. | ......................... | 345/93 |
| 2007/0035491 | A1 | * | 2/2007 | Chen et al. | ....................... | 345/87 |
| 2007/0206126 | A1 | * | 9/2007 | Lin et al. | ......................... | 349/54 |

FOREIGN PATENT DOCUMENTS

| JP | 5-150264 | 6/1993 |
| JP | 9-146121 | 6/1997 |
| JP | 9-166789 | 6/1997 |
| JP | 11-160677 | 6/1999 |
| JP | 2005-249993 | 9/2005 |
| JP | 2007-86474 | 4/2007 |
| TW | 200512694 | 4/2005 |

OTHER PUBLICATIONS

Taiwan Office Action, issued on Nov. 22, 2011.
Japan Patent Office, "Office Action", Aug. 2, 2011, Japan.

* cited by examiner

*Primary Examiner* — Jerry Blevins
(74) *Attorney, Agent, or Firm* — WPAT., PC; Justin King

(57) ABSTRACT

An active array substrate for a flat panel display is disclosed. The active array substrate includes a substrate, a plurality of first conductive lines, a plurality of second conductive lines, a plurality of first repair lines, a plurality of second repair lines, a plurality of third repair lines. The substrate has a display area. The first repair lines cross and are electrically separated from the second conductive lines. The second repair lines cross and are electrically separated from the second conductive lines. Each of the third repair lines is in electrical connection respectively with one of the first repair lines and one of the second repair lines. The second conductive lines are divided into a plurality of second conductive line groups and each of the second conductive line groups respectively corresponds to one of the third repair lines.

17 Claims, 11 Drawing Sheets

STEP A:
using laser illumination to weld the intersection of the representative data line and the representative first repair line such that the data line is electrically connected to the first repair line

STEP B:
using laser illumination to weld the intersection of the representative data line and the representative second repair line such that the data line is electrically connected to the second repair line

FIG. 4D

One embodiment of the present invention.

ACTIVE ARRAY SUBSTRATE FOR FLAT PANEL DISPLAY

BACKGROUND OF THE INVENTION

1. Field of the invention

This invention relates to an active array substrate for a flat panel display (FPD), particularly to an active array substrate for a liquid crystal display, and is capable of lowering the probability of the phenomenon of "weak line" resulting from heavier load of a repair circuit.

2. Description of Related Art

FIG. 1A shows a schematic diagram of an active array substrate for a conventional flat panel display. As shown in FIG. 1A, a conventional active array substrate 1 includes a substrate 11, a plurality of scanning lines 12, a plurality of data lines 13, a plurality of first repair lines 14, a plurality of second repair lines 15, and a plurality of third repair lines 16. The substrate 11 has a display area 111. The scanning lines 12 and the data lines 13 are disposed on the substrate 11. In the display area 111, the scanning lines 12 and the data lines 13 are crossed and electrically separated from each other. On the other hand, the first repair lines 14 and the second repair lines 15 are located outside the display area 111. The first repair lines 14 and the second repair lines 15 cross with the data lines 13 on the upper area and the lower area outside the display area 111 respectively. Generally, the first repair lines 14 and the second repair lines 15 are not in electrical connection with the data lines 13. The third repair lines 16 are disposed along the right area outside the display area 111 and are respectively in electrical connection with the first repair lines 14 and the second repair lines 15. In addition, as shown in FIG. 1A, the active array substrate 1 for the conventional FPD is incorporated respectively with a plurality of data driver chips (not shown) and a plurality of scanning driver chips (not shown) by providing a plurality of first connecting pads 17 and a plurality of second connecting pads 18. Therefore, the data lines 13 are electrically connected to the data driver chips to receive data signals, and the scanning lines 12 are electrically connected to the scanning driver chips to receive scanning signals.

FIG. 1B is an enlarged schematic diagram of the manner of intersection of the first repair lines and the data lines of FIG. 1A. FIG. 1C is an enlarged schematic diagram illustrating the intersection of the second repair lines and the data lines of FIG. 1A. Referring to FIGS. 1A to 1C, as a representative data line 131 has a breach 132, laser illumination is used to weld an intersection portion 133 of the data line 131 and a representative first repair line 14 and to weld an intersection portion 134 of the data line 131 and a representative second repair line 15. And signals transmitted from the data driver chips (not shown) to thin film transistors (not shown) of pixels beneath the breach 132 is through a "repair line circuit". The "repair line circuit" is constituted by the first repair line 14, a representative third repair line 16, the second repair line 15 and the data line 131 beneath the breach 132. Therefore, the pixels can be under control of the data driver chips (not shown).

However, the first repair line 14 and the second repair line 15 are respectively crossed through the data line 13 outside the upper area and the lower area of the display area 111. In other words, the first and second repair lines 14 and 15 are respectively crossed through each of the data lines 13. As the "repair line circuit" is in operation, due to capacitance occurring in the intersection portion of the first repair lines 14 and the data lines 13 and the intersection portion of the second repair lines 15 and the data lines 13, the loading of the "repair line circuit" will be increased. Therefore, though the thin film transistor of the pixel (not shown) beneath the breach 132 can be controlled, the response speed of the thin film transistor of the pixel beneath the breach 132 is slower than that of other thin film transistors. It results in an abnormal frame, and the phenomenon is called "weak line".

Thus, in the industry, an active array substrate for use in a flat panel display and repair method thereof are required to reduce the probability of the "weak line" phenomenon due to heavy load of the repair circuit. Therefore, after repairing, response speed of the thin film transistor of the pixel is not decreased, and the frame on the flat panel display can be maintained normally.

SUMMARY OF THE INVENTION

An active array substrate for a flat panel display (FPD) of the invention includes a substrate having a display area; a plurality of first conductive lines disposed on the substrate; a plurality of second conductive lines disposed on the substrate, crossing and electrically separated from the first conductive lines on the display area; a plurality of first repair lines located on a first area outside the display area, crossing and electrically separated from the second conductive lines; a plurality of second repair lines located on a second area outside the display area and substantially opposite to the first repair lines, crossing and electrically separated from the second conductive lines; and a plurality of third repair lines located on a third area outside the display area and the third area different from the first area and the second area, each of the third repair lines in electrical connection with one of the first repair lines and one of the second repair lines. The second conductive lines are divided into a plurality of second conductive line groups and each of the second conductive line groups respectively corresponds to one of the third conductive lines.

A repair method for an active array substrate of an FPD of the invention, the active array substrate including a substrate having a display area a plurality of first conductive lines disposed on the substrate, a plurality of second conductive lines disposed on the substrate, crossing and electrically separated from the first conductive lines on the display area, a plurality of first repair lines located on a first area outside the display area, crossing and electrically separated from the second conductive lines, a plurality of second repair lines, located on a second area outside the display area and substantially opposite to the first repair lines, crossing and electrically separated from the second conductive lines; and a plurality of third repair lines located on a third area outside the display area and the third area different from the first area and the second area, each of the third repair lines in electrical connection respectively with one of the first repair lines and one of the second repair lines, wherein the second conductive lines are divided into a plurality of second conductive line groups, and each of the second conductive line groups corresponds to one of the third repair lines and at least one of the second conductive lines has a breach on the display area, the method includes the following steps: (A) welding the intersection of the second conductive lines having the breach on the display area and the first repair line such that the second conductive lines having the breach electrically connected to the first repair lines; and (B) welding the intersection of the second conductive lines having the breach and the second repair lines such that the second conductive lines having the breach electrically connected to the second repair lines.

Therefore, the active array substrate of the FPD of the invention is capable of solving the problem of the phenomenon of abnormal pixel display resulting from the data lines having breaches by using a "repair circuit" constituted by the first repair lines, the second repair lines and the third repair lines. After the repair procedure, the signals from the data driver chips can be transmitted to the thin film transistors of the pixels beneath the breach through the "repair circuit" such that the pixels can be controlled by the data driver chips to operate normally. In addition, since the widths of the intersection of the first repair lines and the data lines are smaller than the widths of other parts of the first repair lines. The widths of the intersection of the second repair lines and the data lines are smaller than the widths of other parts of the second repair lines. In the "repair circuit", the capacitance caused by the intersection of the first repair lines and the data lines and by the intersection of the second repair lines and the data lines can be reduced, thereby the loading in operation of the "repair circuit" of the active array substrate of the FPD of the invention can be decreased.

Moreover, since the third repair lines of the active array substrate of the FPD of the present invention has a double layered conductive structure to be a parallel circuit with a plurality of conductive units, the resistance of the "repair circuit" of the active array substrate of the FPD of the invention can be further reduced. Hence, in the active substrate of the FPD of the present invention, the "repair circuit" constituted by the first repair lines, second repair lines and third repair lines has a conductive resistance significantly lower than that of the conventional "repair circuit" such that the probability of the "weak line" phenomenon resulting from heavier load is reduced and the flat panel display provided with the active array substrate of the present invention can display normally after the repair procedure.

In the active array substrate of the FPD of the present invention, the third repair lines may extendedly pass any position from the first repair lines to electrically connecting the second repair lines, preferably extending from one of the first repair lines, passing the location between two adjacent data driver chips and electrically connecting to the corresponding second repair lines or extending passing beneath one of the data driver chips from the first repair lines to electrically connect the second repair lines.

BRIEF DESCRIPTION OF THE DRAWINGS

FIG. 4D is a flow chart showing a repair method of a second preferred embodiment in the active array substrate of the FPD of the invention.

DETAILED DESCRIPTION OF THE PREFERRED EMBODIMENT

Figure 1A:
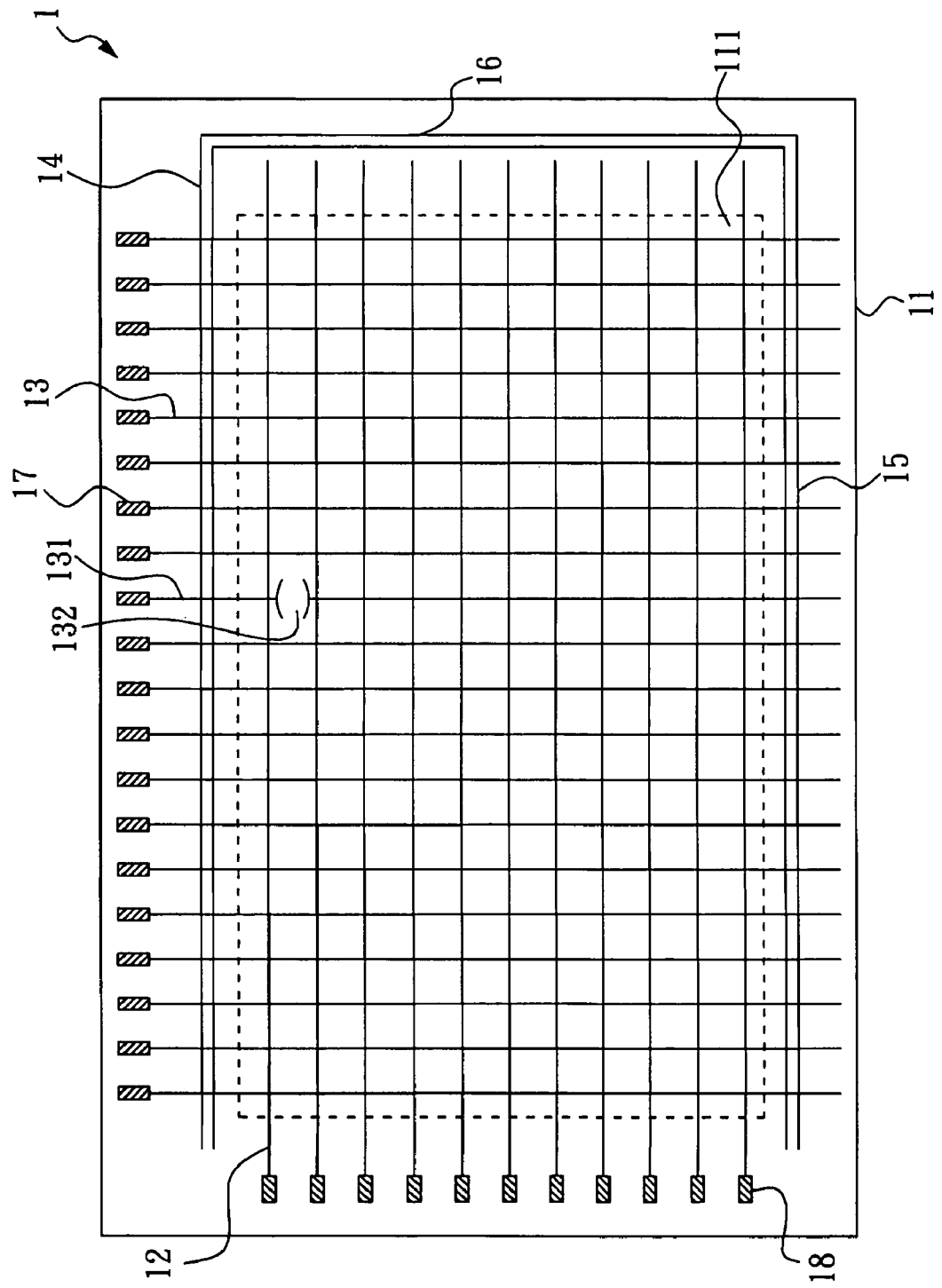
FIG. 1A is a schematic diagram of an active array substrate of a conventional flat panel display.
Figure 1B:
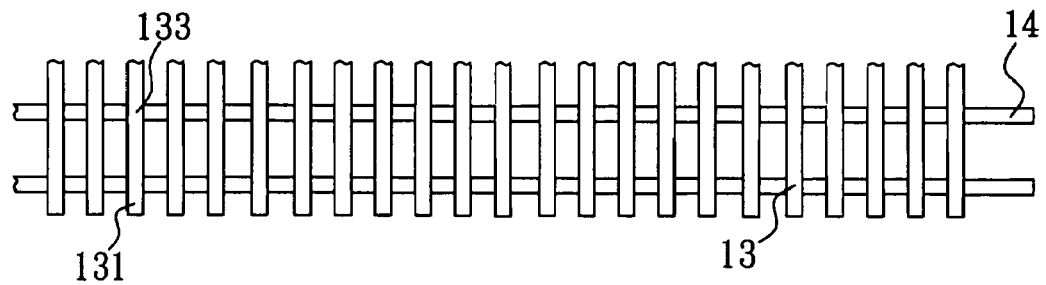
FIG. 1B is an enlarged diagram showing the intersection of the first repair lines and data lines of the active array substrate of the conventional FPD.
Figure 1C:
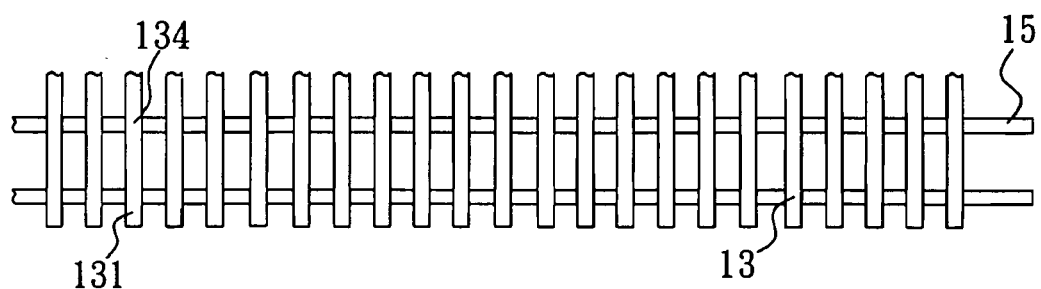
FIG. 1C is an enlarged diagram showing the intersection of the second repair lines and data lines of the active array substrate of the conventional FPD.
Figure 2A:
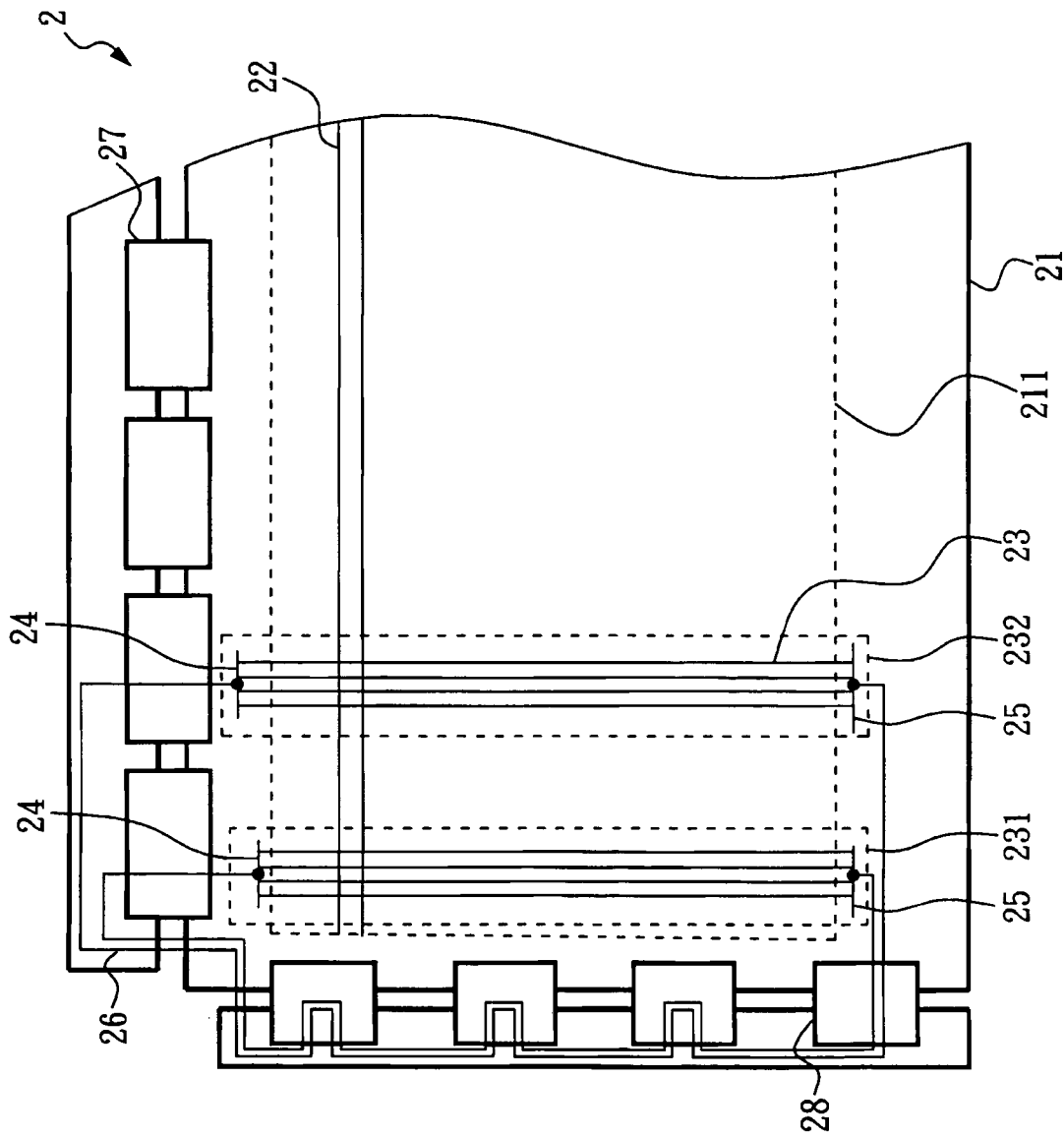
FIG. 2A is a schematic diagram showing a first preferred embodiment of an active array substrate for an FPD of the invention.

FIG. 2A is a schematic diagram of an active array substrate for the FPD of the first preferred embodiment of the invention. An active array substrate 2 of the FPD of the first preferred embodiment of the invention includes a substrate 21, a plurality of scanning lines 22, a plurality of data lines 23, a plurality of first repair lines 24, a plurality of second repair lines 25, and a plurality of third repair lines 26. The substrate 21 has a display area 211. The plurality of scanning lines 22 and the plurality of data lines 23 are disposed on the substrate 21, and they cross but not in electrical connection with each other in the display area 211. On the other hand, the plurality of first repair lines 24 and the plurality of second repair lines 25 are disposed on the substrate 21. The plurality of first repair lines 24 and the plurality of second repair lines 25 respectively cross with the plurality of data lines 23 at the upper area and the lower area outside the display area 211. In a general situation, the first repair lines 24 and the second repair lines 25 are not in electrical connection with the data lines 23. The third repair lines 26 are disposed along the edge area outside the display area 211. Each of the third repair lines 26 is respectively in electrical connection with one of the first repair lines 24 and one of the second repair lines 25.

Moreover, in the active array substrate 2 of the FPD of the first preferred embodiment of the invention, the plurality of the data lines 23 are divided into a plurality of the data line groups 231, and each of the data line groups 231 respectively corresponds to one of the third repair lines 26. In other words, each of the data line groups 231 respectively corresponds to one of the first repair lines 24, one of the second repair lines 25, and one of the third repair lines 26 connected with the previous two repair lines. The first repair lines 24 and the second repair lines 25 are both crossed with and electrically separated from the data lines 23 of the corresponding data line group 231. In addition, in the active array substrate 2 of the FPD of the first preferred embodiment of the invention, each of data line groups 231 may have the same number of data lines 23.

Further, as shown in FIG. 2A, the active array substrate 2 may have a plurality of data driver chips 27 on the upper side of the substrate 2 and have a plurality of scanning driver chips 28 on the left side of the substrate 2. The data lines 23 are electrically connected to the data driver chips 27 to receive data signals and the scanning lines 22 are electrically connected to the scanning driver chips 28 to receive scanning signals. It should be noted that the data driver chips and the scanning driver chips are not limited to FIG. 2A. In the active array substrate of the FPD of the first embodiment of the invention, the substrate may have other number of data driver chips and scanning driver chips. In general, in the first preferred embodiment, the number of the data driver chips is preferably 4 to 8 and the number of the scanning driver chips is preferably 4 to 8. In the first embodiment, the number of the third repair lines is preferably 2 to 8.

Figure 2B:
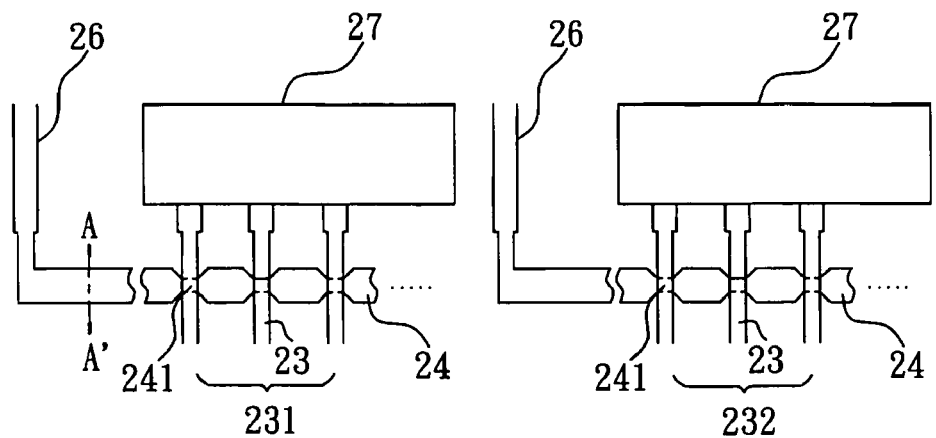
FIG. 2B is an enlarged diagram showing the intersection of the first repair lines and data lines of the first preferred embodiment of the active array substrate of the FPD of the invention.

FIG. 2B is an enlarged schematic diagram showing the intersection of the first repair lines 24 and the data lines 23 of the active array substrate 2 of the FPD of the first preferred embodiment of the invention. Respectively, each of the data lines 23 is electrically connected to the data driver chips 27. The data lines 23 are divided into two data line groups 231 and 232 respectively corresponding to one of data driver chips 27. On the other hand, each of the data line groups 231 and 232 corresponds to one of the first repair lines 24 and one of the third repair lines 26. The first repair line 24 and the third repair line 26 are connected to each other at a side near the data driver chip 27. Therefore, as shown in FIGS. 2A and 2B, in the active array substrate 2 of the FPD of the first preferred embodiment of the invention, a representative first repair line 24, corresponding to the data line group 231, is crossed but not in electrical connection with the data lines 23 of the data line group 231 on the upper area outside the display area 211 of the substrate 21. Corresponding to the data line group 231, a representative third repair line 26 extending from the representative first repair line 24, passes through the location between two adjacent data driver chips 27. The representative third repair line 26 is disposed on the edge area outside the display area 211. A representative second repair line 25, corresponding to the data line group 231, is electrically connected to the representative third repair line 26 on lower area outside the display area 211. It should be noted that in the active array substrate 2 of the FPD of the first preferred embodiment of the invention, the number of the data line groups is not limited to that shown in FIG. 2B. In the active array substrate 2 of the FPD of the first preferred invention of the invention, the number of data line groups may be changed.

In addition, as shown in FIG. 2B, the width of the intersection 241 of the representative first repair line 24 and the data lines 23 is smaller than the width of other parts of the representative first repair line 24. "Other parts of the representative first repair line 24" are such as parts of the representative first repair line 24 located between two adjacent data lines 23. Therefore, in the active array substrate 2 of the FPD of the first preferred embodiment of the invention, the total area of the intersection of the first repair line 24 and the data lines 23 can be reduced such that the capacitance resulting from the intersection of the first repair line 24 and the data lines 23 can be decreased. Then the loading of using the first repair line 24 to repair the data lines 23 having breaches is reduced and the occurrence of the "weak line" phenomenon is avoided.

Figure 2C:
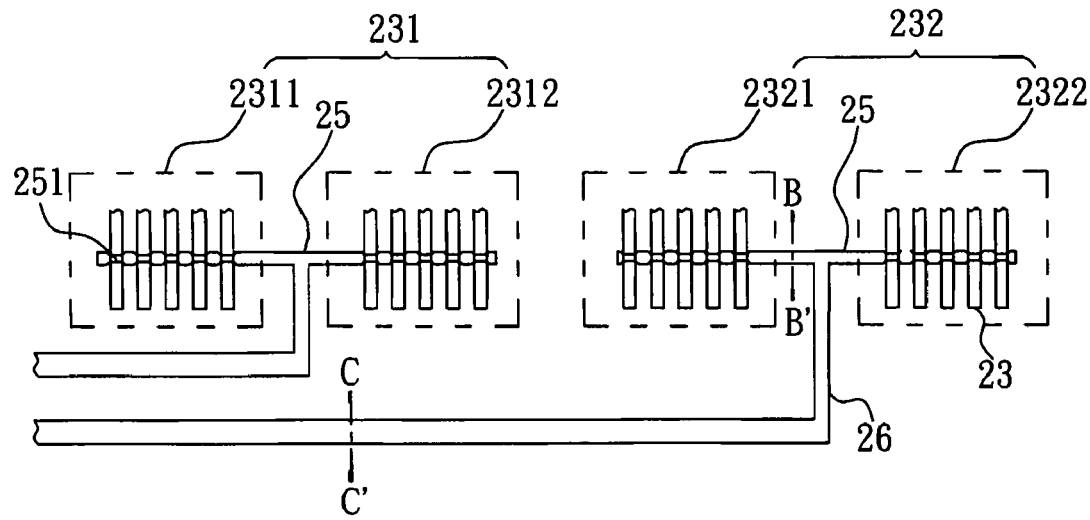
FIG. 2C is an enlarged diagram showing the intersection of the second repair lines and data lines of the first preferred embodiment of the active array substrate of the FPD of the invention.

Referring to FIG. 2C, the drawing shows the manner of intersection of the representative second repair line 25 and the data lines 23 in the active array substrate 2 of the FPD of the first preferred embodiment of the invention. As described previously, the representative second repair line and the data lines are crossed but not in electrical connection with each other on the lower area outside display area of the substrate. Through the third repair line, the representative second repair line is electrically connected to the first repair line which is on the upper area outside the display area. As mentioned above, in the active array substrate of the FPD of the first preferred embodiment of the invention, the data lines may be divided into a number of data line groups and each of the data line groups may further be separated into two data line subgroups. As illustrated in FIG. 2C, the two data line groups 231 and 232 may further be separated into four data line subgroups 2311, 2312, 2321, and 2322. The second repair line 25 corresponding to the data line group 231 is crossing but not in electrical connection with the data lines 23 of the two data line subgroups 2311 and 2312 separated from the data line group 231 on the lower area outside the display area of the substrate.

Besides, as illustrated in FIG. 2C, the width of the intersection 251 of the representative second repair line 25 and the data lines 23 is smaller than the width of other parts of the representative second repair line 25. "Other parts of the representative second repair line 25" is such as parts of the representative second repair line 25 located between two adjacent data lines 23. Therefore, in the active array substrate 2 of the FPD of the first preferred embodiment of the invention, the total area of the intersection of the second repair line 25 and the data lines 23 can be reduced such that the capacitance resulting from intersection of the second repair line 25 and the data lines 23 can be decreased. Then the loading of using the second repair line 25 to repair the data lines 23 having breaches is reduced and the occurrence of the "weak line" phenomenon is avoided.

Figure 3A:
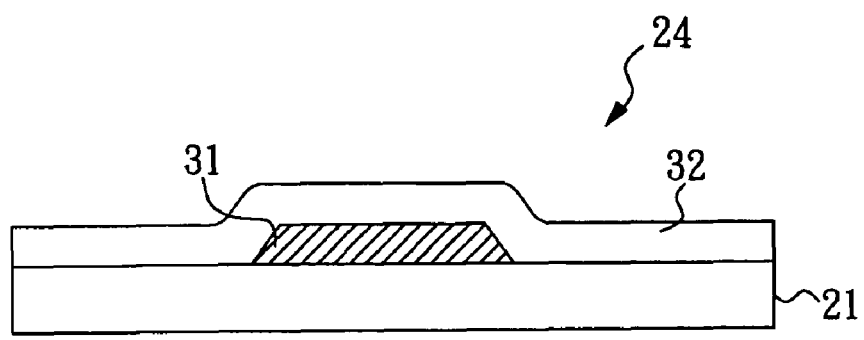
FIG. 3A is a cross sectional diagram showing the first repair line, taken along line A-A' of FIG. 2B for the first preferred embodiment of the active array substrate of the FPD of the invention.
Figure 3B:
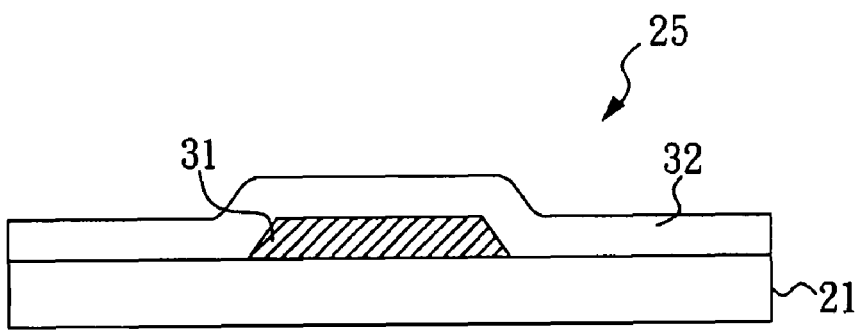
FIG. 3B is a cross sectional diagram showing the second repair line, taken along line B-B' of FIG. 2C for the first preferred embodiment of the active array substrate of the FPD of the invention.

FIG. 3A is a cross sectional diagram showing the representative first repair line, taken along line A-A' of FIG. 2B for the first preferred embodiment of the active array substrate of the FPD of the invention. The diagram shows that the representative first repair line 24 includes a first conductive layer 31 and an insulating layer 32. The first conductive layer 31 is formed on the substrate 21. In addition, the insulating layer 32 covers the surface of the first conductive layer 31 such that the representative first repair line 24 is electrically insulated from the plurality of data lines (not shown) which cross with the representative first repair line 24. Similarly, FIG. 3B is a cross sectional diagram showing the representative second repair line, taken along line B-B' of FIG. 2C for the first preferred embodiment of the active array substrate of the FPD of the invention. The diagram shows that the representative second repair line 25 includes the first conductive layer 31 and the insulating layer 32. The first conductive layer 31 is formed on the substrate 21. In addition, the insulating layer 32 covers the surface of the first conductive layer 31 such that the second repair line 25 is electrically insulated from the plurality of data lines (not shown) which cross with the representative second repair line 24.

Figure 3C:
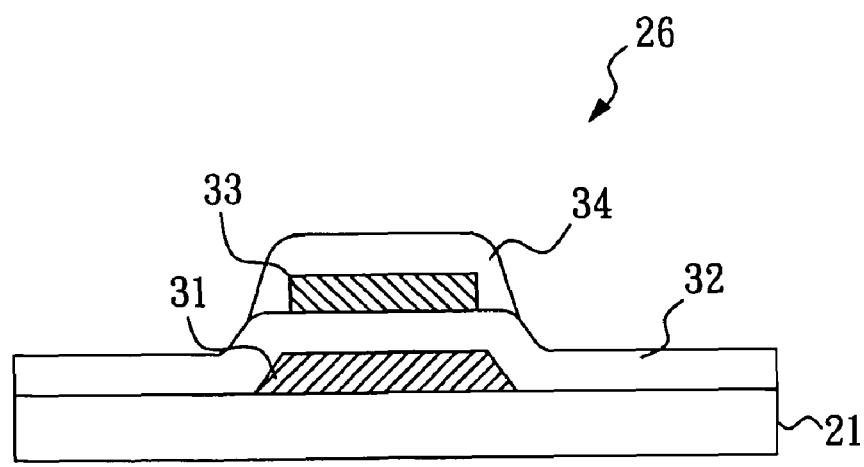
FIG. 3C is a cross sectional diagram showing the third repair line, taken along line C-C' of FIG. 2C for the first preferred embodiment of the active array substrate of the FPD of the invention.

FIG. 3C is a cross sectional diagram showing the representative third repair line, taken along line C-C' of FIG. 2C for the first preferred embodiment of the active array substrate of the FPD of the invention. The diagram shows that the representative third repair line 26 includes the first conductive layer 31, the insulating layer 32, a second conductive layer 33, and a protecting layer 34. The first conductive layer 31 is formed on the substrate 21. The insulating layer 32 covers the surface of the first conductive layer 31. The second conductive layer 33 covers the surface of the insulating layer 32, and the protecting layer 34 covers the surface of the second conductive layer 33. In addition, in order to reduce conductive resistance of the third repair line 26 by making the first conductive layer 31 and the second conductive layer 33 in a "parallel connection", the representative third repair line 26 further includes a plurality of conductive units (not shown) respectively in electrical connection with the first conductive layer 31 and the second conductive layer 33. The conductive units may be conductive holes or conductive pads. The conductive units are separately disposed at intervals in the representative third repair line 26. Based on this, in the active array substrate of the PPD of the first embodiment of the invention, the representative third repair line 26 is a conductive line having a parallel circuit such that the conductive resistance of the representative third repair line having a parallel circuit is further lower than that of the conventional conductive line only having one conductive layer.

As described above, in the active array substrate of the FPD of the first embodiment of the invention, partial components of the first repair lines, the second repair lines, and the third repair lines are the same, such as the first conductive layer 31 and the insulating layer 32. The first repair lines, the second repair lines, and the third repair lines are simultaneously formed on different locations of the substrate in the manufacturing process of the active array substrate of the FPD of the first embodiment of the invention. In addition, in the manufacturing process of the active array substrate of the FPD of the invention, the material of the first conductive layer 31 may be aluminum, that of the insulating layer 32 may be silicon oxide, that of the second conductive 33 may be chromium, molybdenum, molybdenum-tungsten alloy or a combination thereof, and that of the protecting layer 34 may be indium tin oxide (ITO).

Figure 4A:
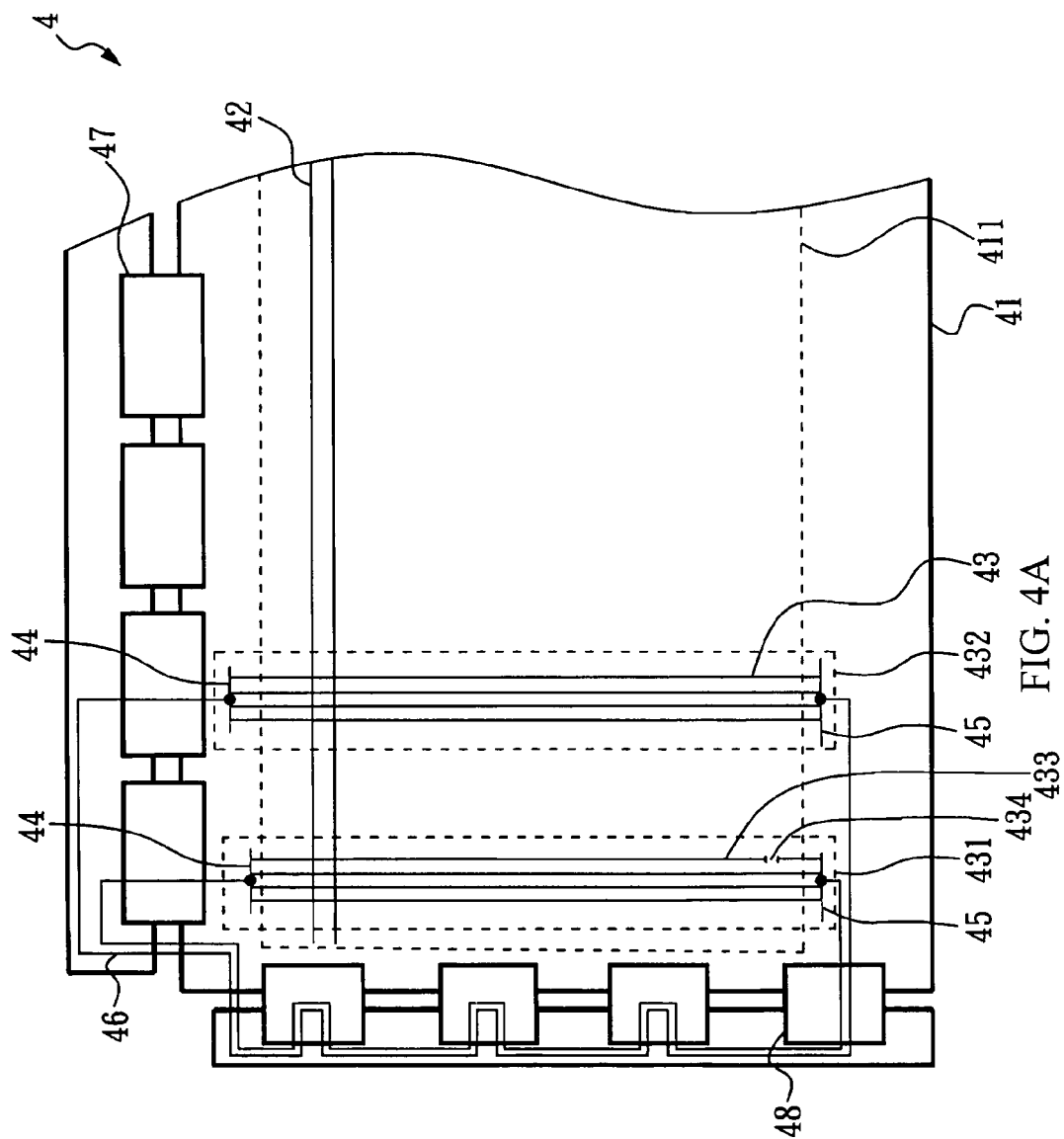
FIG. 4A is a schematic diagram showing an active array substrate of an FPD required to be repaired.

FIG. 4A is a schematic diagram showing an active array substrate 4 of an FPD and the active array substrate 4 is required to be repaired. The active array substrate 4 includes: a substrate 41, a plurality of scanning lines 42, a plurality of data lines 43, a plurality of first repair lines 44, a plurality of second repair lines 45, and a plurality of third repair lines 46. The substrate 41 has a display area 411. The plurality of scanning lines 42 and the plurality of data lines 43 are disposed on the substrate 41 and they cross but not in electrical connection with each other in the display area 411. On the other hand, the plurality of first repair lines 44 and the plurality of second repair lines 45 are disposed on the substrate 41. The plurality of first repair lines 44 and the plurality of second repair lines 45 respectively cross with the plurality of data lines 43 at the upper area and the lower area outside the display area 411. In a general situation, the first repair lines 44 and the second repair lines 45 are not in electrical connection with the data lines 43. The third repair lines 46 are disposed along the edge area outside the display area 411. Each of the third repair lines 46 is respectively electrically connected to one of the first repair lines 44 and one of the second repair lines 45.

Moreover, in the active array substrate 4 required to be repaired, the plurality of data lines 43 are divided into a plurality of data line groups 431 and each of the data line group 431 respectively corresponds to one of the third repair lines 46. In other words, each of the data line groups 431 respectively corresponds to one of the first repair lines 44, one of the second repair lines 45, and one of the third repair lines 46 connected with the previous two repair lines. The first repair line 44 and the second repair line 45 are both crossed with and electrically separated from the plurality of data lines 43 of the corresponding data line group 431. In addition, in the active array substrate 4 of the FPD required to be repaired, each of data line groups 431 may have the same number of the data lines 43.

As shown in FIG. 4A, a representative data line 433 of the data line group 431 in the active array substrate 4 of the FPD required to be repaired has a breach 434 in the display area 411 such that the representative data line 433 has an broken circuit. Even through the data line 433, the data signals from the data driver chip 47 cannot be transmitted to thin film transistors (not shown) of each pixel electrically connected with the data line 433 such that the display condition of these pixels cannot be controlled. It makes an abnormal frame.

Figure 4B:
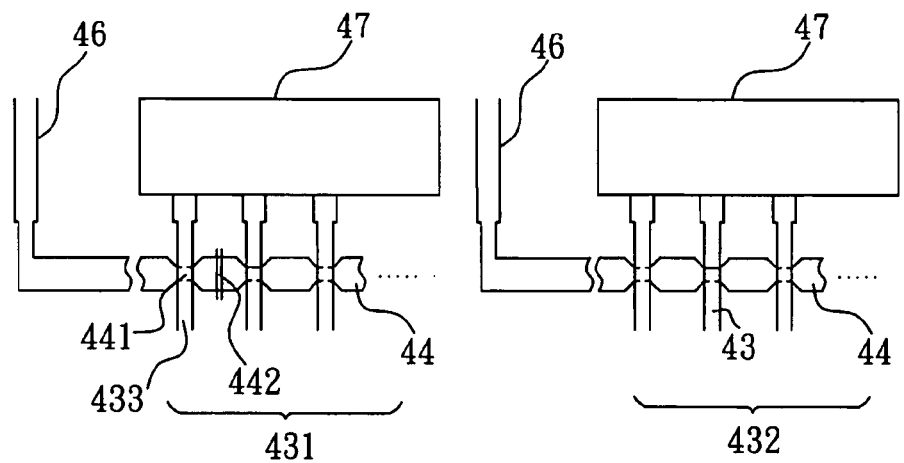
FIG. 4B is an enlarged schematic diagram showing the intersection of the first repair line and data lines for the active array substrate of the FPD requiring repair of FIG. 4A.

FIG. 4B is an enlarged schematic diagram showing the manner of intersection of the first representative repair line and data lines of the active array substrate of the FPD required to repaired of FIG. 4A. Each of the data lines 43 is electrically connected to the data driver chip 47, and the data lines 43 are divided into two data line groups 431 and 432. Each of data line groups 431 and 432 respectively corresponds to one data driver chip 47. Moreover, each of the data line groups 431 and 432 both corresponds to one of the first repair lines 44 and one of the third repair lines 46. The first repair line 44 and the third repair line 46 are connected to each other at one side near the data driver chip 47. The data line 433 having a breach 434 (FIG. 4A) is in the data line group 431.

Therefore, as shown in FIG. 4A and FIG. 4B, a representative first repair line 44 corresponding to the data line group 431 and the data lines 43 of the data line group 431 are crossed but not in electrical connection with each other at the upper area outside the display area 411 of the substrate 41. Corresponding to the data line group 431, a representative third repair line 46 extending from the representative first repair line 44, passes through the location between two adjacent data driver chips 47. The representative third repair line 46 is disposed on the edge area outside display area 411. A representative second repair line 45, corresponding to the data line group 431, is electrically connected to the representative third repair line 46 on the lower area outside the display area 411.

Besides, as shown in FIG. 4A, a plurality of data driver chips 47 can be incorporated into the active array substrate 4 at the upper area outside display area 411. A plurality of scanning driver chips 48 can be incorporated into the active array substrate 4 at the left area outside the display area 411. Therefore, the data lines 43 are electrically connected to the data driver chips 47 to receive data signals and the scanning lines 42 are electrically connected to the scanning driver chips 48 to receive scanning signals.

Figure 4C:
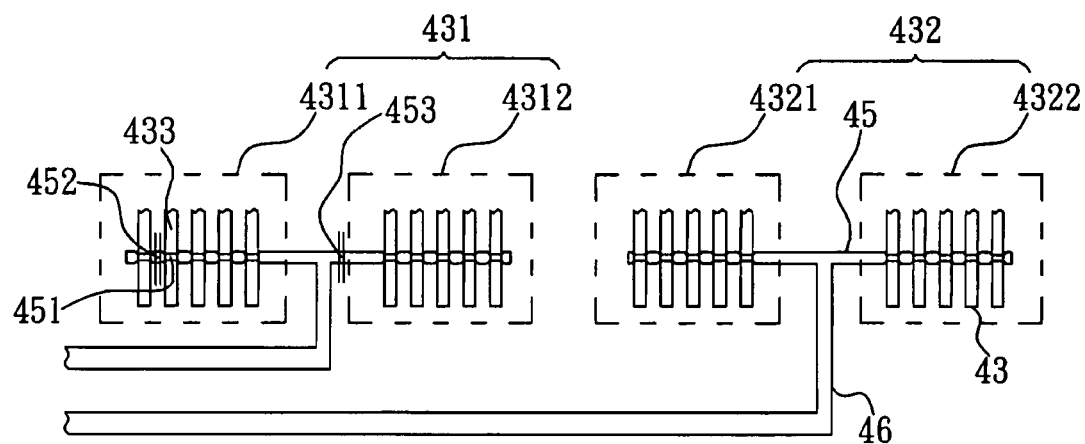
FIG. 4C is an enlarged schematic diagram showing the intersection of the second repair line and data lines for the active array substrate of the FPD requiring repair of FIG. 4A.

Moreover, referring to FIG. 4C, it shows the manner of intersection of the second repair line and data lines of the active array substrate of the FPD required to be repaired of FIG. 4A. As described previously, in the active array substrate of the FPD required to be repaired, data lines may be divided into a plurality of data line groups and each of the data line groups may further be separated into two data line subgroups. As shown in FIG. 4C, the two data line groups 431 and 432 shown in FIG. 4B may further be divided into four data line subgroups 4311, 4312, 4321 and 4322. The representative second repair line 45 corresponding to the data line group 431 and the data lines 43 of the two data line subgroups 4311 and 4312 of the data line group 431 is crossed but not in electrical connection with each other at the lower area outside the display area.

Sequentially, how to repair an active array substrate by the repair method for the active array substrate of the FPD of the second preferred embodiment of the invention is explained.

As shown in FIG. 4A, an active array substrate includes: a substrate 41 having a display area 411; a plurality of scanning lines 42 disposed on the substrate; a plurality of data lines 43 disposed on the substrate 41 crossing but not being in electrical connection with the scanning lines 42 in the display area 411; a plurality of first repair lines 44 disposed on a first area outside the display area 411 and crossing but not being in electrical connection with the data lines 43; a plurality of second repair lines 45, disposed on a second area outside the display area 411 and substantially opposite to the first repair lines 44, crossing but not being in electrical connection with the data lines 43; a plurality of third repair lines 46 disposed on a third area outside the display area 411 and the third area different from first area and the second area, each of the third repair lines 46 in electrical connection with one of the first repair lines 44 and one of the second repair lines 45; and at least one of the data lines 43, i.e. a representative data line 433, having a breach 434 on the display area 411;

As shown in FIG. 4D, the repair method includes at least the following steps:

Step A: using laser illumination to weld the intersection 441 of the representative data line 433 and the representative first repair line 44 (FIG. 4B) such that the data line 433 is electrically connected to the first repair line 44; and Step B: using laser illumination to weld the intersection 451 of the representative data line 433 and the representative second repair line 45 (FIG. 4C) such that the data line 433 is electrically connected to the second repair line 45.

After the representative data line 433 having the breach 434 is respectively connected to the representative first repair line 44 and the representative second repair line 45 at the upper and lower areas outside the display area 411, the data signals will not be transmitted to the thin film transistors of the pixels (not shown) beneath the breach 434 through the original route of the representative data line 433 but through the route of the representative first repair line 44, the representative third repair line 46, the representative second repair line 45 and the representative data line 433 beneath the breach 434. Therefore, the pixels can be controlled by the data driver chip to operate normally. Moreover, the welding method is not limited to laser. One skilled in the art may change the welding method based on the practical requirement.

After the step (A) of using laser illumination to make the representative data line 433 having the breach 434 to electrically connect the representative first repair line 44 on the upper area outside the display area 411, the repair method of the active array substrate of the FPD of the second preferred embodiment of the invention further includes a step (A1): using laser illumination to cut apart the representative first repair line 44 at a cutting point 442 in the right side outside the intersection 441 of the representative data line 433 and the representative first repair line 44 such that two ends of the representative first repair line 44 near the cutting point 442 are electrically insulated from each other (as shown in FIG. 4B). Based on this, a part of the representative first repair line 44 at the right side outside the cutting point 442 is electrically insulated from the "repair circuit" constituted by other parts of the representative first repair line 44, the representative third repair line 46 and the representative second repair line 45. Similarly, after the step (B) of using laser illumination to make the representative data line 433 having the breach 434 to electrically connect the representative second repair line 45 on the lower area outside the display area 411, the repair method of the active array substrate of the FPD of the second preferred embodiment of the invention further includes a step (B1): using laser illumination to cut apart the representative second repair line 45 respectively at cutting points 452 and 453. The cutting point 452 is located in the left side outside the intersection 451 and the cutting point 453 is located in the right side near the electrical connection portion of the third representative repair line 46 and the representative second repair line 45. Based on this, a part of the representative second repair line 45 at the left side outside the cutting point 452 and a part of the representative second repair line 45 at the right side outside the cutting point 453 is electrically insulated from the "repair circuit" constituted by the representative first repair line 44, the representative third repair line 46 and other parts of the representative second repair line 45. Other parts of the representative second repair line 45 are electrically connected to the representative data line 43.

After welding and cutting apart, the active array substrate 4 of the FPD required to be repaired, with the "repair circuit" constituted by the first repair line 44, the second repair line 45 and the third repair line 46, can make the thin film transistors of the pixels (not shown) beneath the breach 434 to be controlled by the data driver chips 47. In addition, since parts of the first repair lines 44 and parts of the second repair lines 45, which do not belong to the above-mentioned "repair circuit", have been cut apart to be electrically insulated with the "repair circuit", the parts will not increase additional capacitance of the "repair circuit" when the "repair circuit" is in operation. Therefore, the occurrence of the "weak line" phenomenon will not occur due to the loading of the "repair circuit" during operation.

Figure 5A:
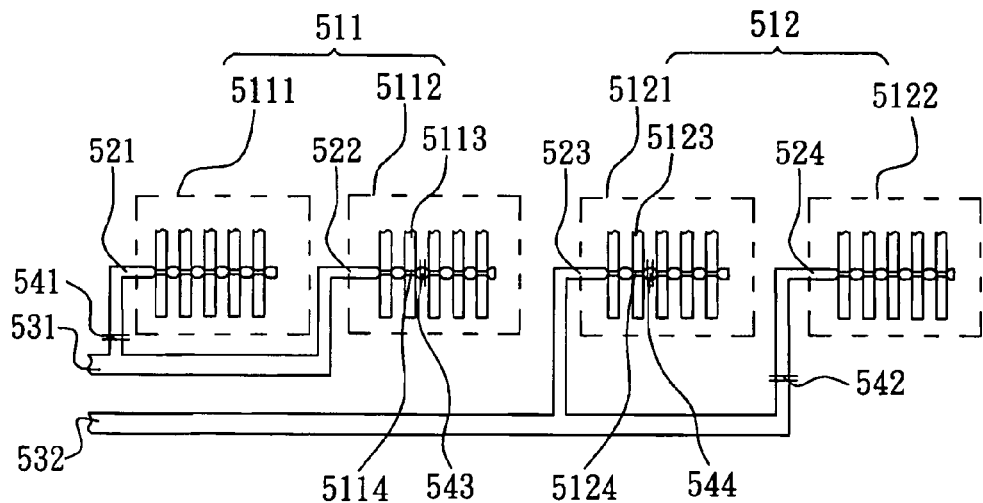
FIG. 5A is an enlarged schematic diagram showing the intersection of the second repair lines and data lines of a third preferred embodiment in the active array substrate of the FPD of the invention.

FIG. 5A is an enlarged schematic diagram showing the manner of intersection of second repair lines and data lines of an active array substrate for FPD of a third preferred embodiment of the invention. The data lines may be divided into a plurality of data line groups 511 and 512 and each of the data line groups 511 (512) may further be divided into two data line subgroups 5111 and 5112 (5121 and 5122). As shown in FIG. 5A, the data lines are divided into two data line groups 511 and 512 and the data line groups 511 and 512 are divided into four data line subgroups 5111, 5112, 5121 and 5122. Each of the data line subgroups 5111, 5112, 5121 and 5122 may have the same number of the data lines. As shown in FIG. 5A, second repair lines 521, 522, 523 and 524 are respectively crossed but not in electrical connection with the data lines of the data line subgroups 5111, 5112, 5121 and 5122. In addition, through the third repair line 531, the second repair lines 521 and 522 are electrically connected to a first repair line (not shown) at the upper area outside the display area of the active array substrate for the FPD of the third preferred embodiment of the invention. Through the third repair line 532, the second repair lines 523 and 524 are electrically connected to another first repair line (not shown) at the upper area outside the display area of the active array substrate for the FPD of the third preferred embodiment of the invention.

As a data line 5113 of the data line subgroup 5112 and a data line 5123 of the data line subgroup 5121 are required to be repaired, laser illumination may be used to respectively weld intersection 5114 of the data lines 5113 and the second repair line 522 and intersection 5124 of the data lines 5123 and the second repair line 523. Therefore, through the third repair line 531, the data lines 5113 are electrically connected to the first repair line (not shown) at the upper area outside the display area of the active array substrate for the FPD of the third preferred embodiment of the invention. Through the third repair line 532, the data lines 5123 are electrically connected to another first repair line (not shown) at the upper area outside the display area of the active array substrate for the FPD of the third preferred embodiment of the invention. Furthermore, since the second repair lines 521 and 524 are not used in the previous repair procedure, after the previous welding procedure, laser illumination may be utilized to respectively cut apart the second repair lines 521 and 524 at cutting points 541 and 542 such that the second repair lines 521 and 524 are isolated from the "repair circuit" formed by the welding procedure.

Besides, laser illumination may be utilized to respectively cut apart the second repair lines 522 and 523 at cutting points 543 and 544 respectively. In FIG. 5A, the cutting point 543 is located in the right side near the intersection 5114 and the cutting point 544 is located in the right side near intersection 5124. Thus, a part of the second repair line 522 located in the right side near the cutting point 543 and a part of the second repair line 523 in the right side near the cutting point 544 are also isolated from the "repair circuit" formed by the welding procedure. Based on this, the parts of the second repair line not used in the "repair circuit" will not increase additional capacitance of the "repair circuit" when the "repair circuit" is in operation and thus the "weak line" phenomenon will not occur due to the loading of the "repair circuit" during operation.

Figure 5B:
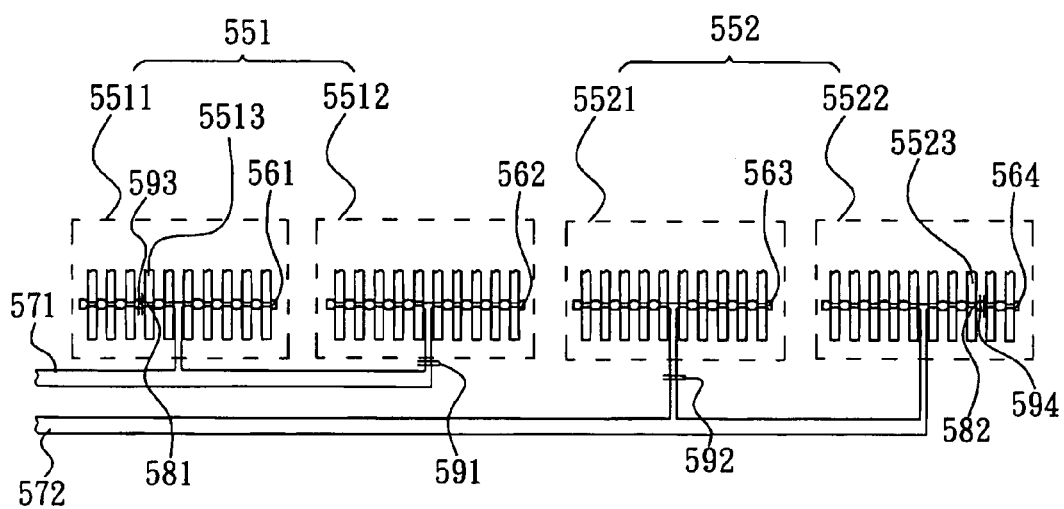
FIG. 5B is an enlarged schematic diagram showing the intersection of the second repair lines and data lines of a fourth preferred embodiment in the active array substrate of the FPD of the invention.

FIG. 5B is an enlarged schematic diagram showing the way of intersection of second repair lines and data lines of a fourth preferred embodiment of the active array substrate of the FPD of the invention. The data lines may be divided into a plurality of data line groups 551 and 552 and each of the data line groups 551 (552) may be further divided into two data line subgroups 5511 and 5512 (5521 and 5522). As shown in FIG. 5B, the two data line groups 551 and 552 may further be divided into four data line subgroups 5511, 5512, 5521 and 5522. Each of the data line subgroups 5511, 5512, 5521 and 5522 may have the same number of data lines. As shown in FIG. 5B, second repair lines 561, 562, 563 and 564 are respectively crossed but not in electrical connection with the data lines of the data line subgroups 5511, 5512, 5521 and 5522. In addition, through the third repair line 571, the second repair lines 561 and 562 are electrically connected to a first repair line (not shown) at the upper area outside the display area of the active array substrate for the FPD of the fourth preferred embodiment of the invention. Through the third repair line 572, the second repair lines 563 and 564 are electrically connected to another first repair line (not shown) at the upper area outside the display area of the active array substrate for the FPD of the fourth preferred embodiment of the invention.

In FIG. 5B, as a data line 5513 of the data line subgroup 5511 and a data line 5523 in the data line subgroup 5522 are required to be repaired, laser illumination may be used to respectively weld intersection 581 of the data lines 5513 and the second repair line 561 and intersection 582 of the data lines 5523 and the second repair line 564. Therefore, through the third repair line 571, the data lines 5513 are electrically connected to the first repair line (not shown) at the upper area outside the display area of the active array substrate for the FPD of the fourth preferred embodiment of the invention. Through the third repair line 572, the data lines 5523 are electrically connected to another first repair line (not shown) at the upper area outside the display area of the active array substrate for the FPD of the fourth preferred embodiment of the invention. Furthermore, since the second repair lines 562 and 563 are not used in the repair procedure, after the above-mentioned welding procedure, laser illumination may be further utilized to respectively cut apart the second repair lines 562 and 563 at cutting points 591 and 592 such that the second repair lines 562 and 563 are isolated from the "repair circuit" formed by the welding procedure.

Besides, laser illumination may be utilized to respectively cut apart the second repair lines 561 and 564 at cutting points 593 and 594 respectively. In FIG. 5B, the cutting point 593 is located in the left side near intersection 581 and the cutting point 594 is located in the right side near intersection 582. Thus, a part of the second repair line 561 located in the left side near the cutting point 593 and a part of the second repair line 564 in the right side near the cutting point 594 are also isolated from the "repair circuit" formed by the welding procedure. Based on this, the parts of the second repair line not used in the "repair circuit" will not increase additional capacitance of the "repair circuit" when the "repair circuit" is in operation and thus the "weak line" phenomenon will not occur due to the loading of the "repair circuit" during operation.

Figure 6:
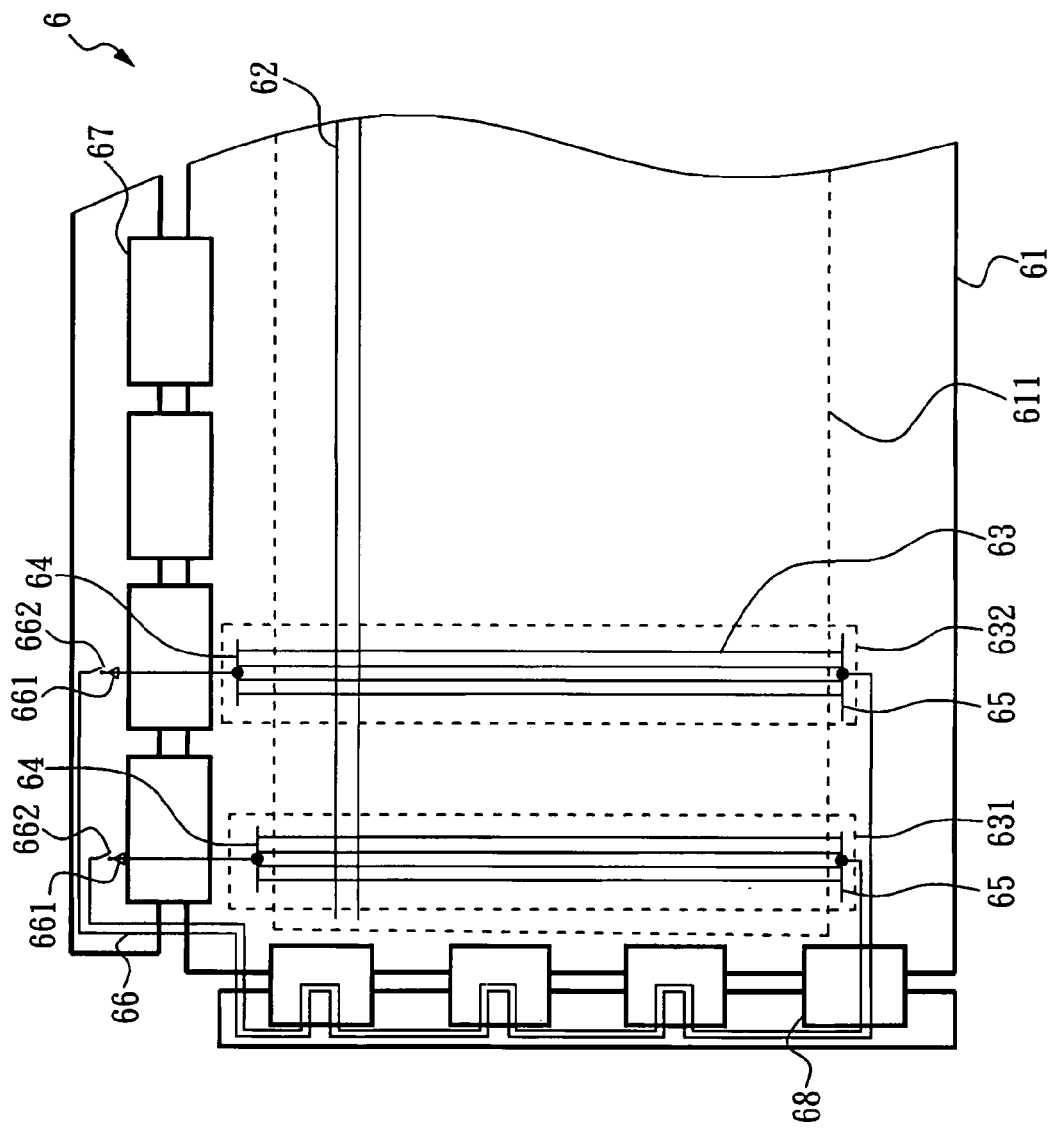
FIG. 6 is a schematic diagram showing a fifth preferred embodiment in the active array substrate of the FPD of the invention.

FIG. 6 is a schematic diagram showing a fifth preferred embodiment of the active array substrate of the FPD of the invention. The structure of the fifth preferred embodiment of the invention is similar with that of the first preferred embodiment of the invention. In the preferred embodiment, an active array substrate 6 of the FPD includes: a substrate 61, a plurality of scanning lines 62, a plurality of data lines 63, a plurality of first repair lines 64, a plurality of second repair lines 65, and a plurality of third repair lines 66. The substrate 61 has a display area 611 and the plurality of scanning lines 62 and the plurality of data lines 63 are disposed on the substrate 61. The plurality of scanning lines 62 and the plurality of data lines 63 cross and not in electrical connection with each other in the display area 611. On the other hand, the plurality of first repair lines 64 and the plurality of second repair lines 65 are disposed on the substrate 61. The plurality of first repair lines 64 and the plurality of second repair lines 65 respectively cross with the plurality of data lines 63 in the upper area and the lower area outside the display area 611. In a general situation, the first repair lines 64 and the second repair lines 65 are not in electrical connection with the data lines 63. The plurality of third repair lines 66 are disposed along the edge area outside the display area 611. Each of the third repair lines 66 is respectively in electrical connection with one of the first repair lines 64 and one of the second repair lines 65. Further, as shown in FIG. 6, a plurality of data driver chips 67 can be incorporated into the active array substrate 6 on the upper area outside the display area 611. A plurality of scanning driver chips 68 can be incorporated into the active array substrate 6 on the left area outside the display area 611. Therefore, the plurality of data lines 63 are electrically connected to the data driver chips 67 to receive data signals and the scanning lines 62 are electrically connected to the scanning driver chips 68 to receive scanning signals.

The difference between the active array substrate of the FPD of the fifth preferred embodiment and that of the first embodiment is as follows. Each of the third repair lines 66 has an operation amplifier 661 near one of the data driver chips 67 for amplifying signals from the data driver chip 67. In addition, each of the third repair lines 66 has one switch 662 near the operation amplifier 661. The switch 662 is preferably a transistor switch. Hence, the parts of the first repair lines not used in the "repair circuit" are isolated from other parts of the first repair lines used in the "repair circuit". Therefore, the "surplus" parts not used in the "repair circuit" will not constitute the loading of the "repair circuit" during operation to result in the occurrence of the "weak line" phenomenon.

Furthermore, the active array substrate of the FPD of this preferred embodiment of the invention can avoid that the output signal of the operation amplifier used in the "repair circuit" is unexpectedly transmitted back to output terminals of another operation amplifiers not used in the "repair circuit". It can also avoid adversely affecting the stability of the data driver chips having other operation amplifiers during operation.

Figure 7:
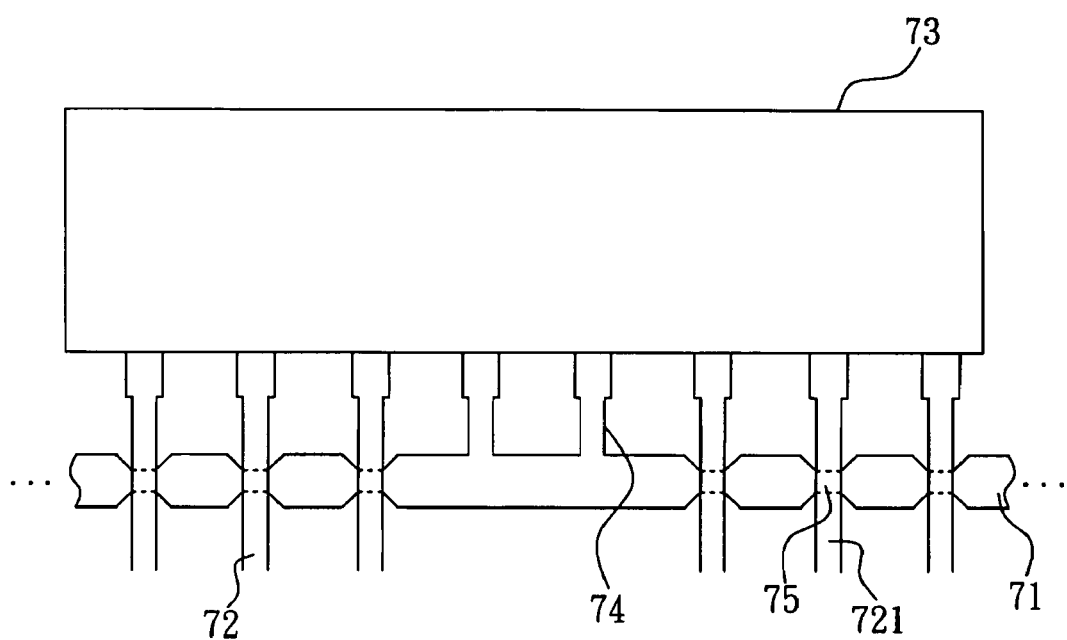
FIG. 7 is an enlarged schematic diagram showing the intersection of the first repair lines and data lines of a sixth preferred embodiment in the active array substrate of the FPD of the invention.

FIG. 7 is an enlarged schematic diagram showing the manner of intersection of first repair lines and data lines of a sixth preferred embodiment of the active array substrate of the FPD of the invention. A representative first repair line 71 and a plurality of data lines 72 are crossed near a data driver chip 73. Each of the data lines 72 is electrically connected to the data driver chip 73. The difference between the active array substrate of the FPD of sixth preferred embodiment and that of the first preferred embodiment is as follows. A third repair lines 74 passes through the bottom outside the data driver chip 73 and is electrically connected to the representative first repair line 71 such that the representative first repair line 71 is electrically connected to a second repair line (not shown) in the substantially opposite side outside the display area through the third repair lines 74. The third repair line 74 of the sixth embodiment is not like a third repair line of the first embodiment. The third repair line of the first embodiment, extending from the first repair lines, passes through the location between two adjacent driver chips and is electrically connected to the second repair line in an substantially opposite side outside the display area (FIG. 2B). Thus, even if the pin number of the data driver chip 73 is increased, the distance between two adjacent third repair lines 74 can be still maintained at a fixed value. Therefore, the distance, between an intersection 75 of the first repair line 71 and a representative data line 721 having a breach (not shown) and an electrical connection location of the third repair line 74 and the first repair line 71, can be maintained in a range that is smaller than a half of the width of the data driver chip 73. The design can effectively reduce the length of the first repair line 71 of the "repair line". Therefore, the capacitance due to the intersection of the first repair line 71 and the data lines 72 is decreased.

On the other hand, as shown in FIG. 7, the width of the intersection 75 of the first repair line 71 and the data line 721 is smaller than the width of the other parts of the first repair line 71. Other parts of the first repair line 71 are such as parts of the first repair line 71 between two adjacent data lines 72. Therefore, in the active array substrate of the six preferred embodiment, the total area of the intersection of the first repair line 71 and the data lines 72 can be reduced such that the capacitance resulting from intersection of the first repair line 71 and the data lines 72 is reduced. Then the loading of the "repair circuit" to repair the data lines having breaches is reduced and the occurrence of the "weak line" phenomenon is avoided.

In view of the above, the active array substrate of the FPD of the invention uses the "repair circuit" constituted by the first repair lines, the second repair lines and the third repair lines to resolve the problem of abnormal displaying of the pixels resulting from the data lines having breaches. After the repair procedures, the signals from the data driver chips may transmit the thin film transistors of the pixels beneath the breaches via the "repair circuit" such that the pixels can be controlled by the data driver chips again to operate normally. In addition, in the invention, the width of the intersection of a representative first repair line and the data lines is smaller than the width of other parts of the representative first repair line, and the width of the intersection of a representative second repair line and the data lines is also smaller than the width of other parts of the representative second repair line. Therefore, the capacitance of the "repair circuit", produced by the intersection of the first repair lines and the data lines and by the intersection of the second repair lines and the data lines, can be reduced. Then the loading of the "repair circuit" during operation is decreased.

Moreover, in the active array substrate of the FPD of the invention, since the third repair lines have a double-layered conductive structure to be a "parallel circuit" with a plurality of conductive units, the resistance of the "repair circuit" can be further reduced. Thus, the conductive resistance of the "repair circuit" constituted by the first repair lines, second repair lines and third repair lines of the invention is significantly lower than conductive resistance of the conventional "repair circuit". Therefore, in the active array substrate of the FPD of the invention, the probability of "weak line" phenomenon occurring due to heavier load is lowered. The frame of the FPD after the repair procedures can be displayed normally.

The above embodiments are merely submitted to interpret the present invention for the sake of convenience. What is claimed by the invention should be based on what is described in the claims but not limited to the above-mentioned embodiments.

What is claimed is:

1. An active array substrate for a flat panel display having a display area between a first set of repair lines and a second set of repair lines, comprising:
    a substrate housing the display area;
    a plurality of first conductive lines disposed on the substrate;
    a plurality of second conductive lines, disposed on the substrate, crossing and being electrically separated from the first conductive lines on the display area;
    a plurality of first repair lines among the first set of repair lines, located on a first area outside the display area, crossing and being electrically separated from the second conductive lines;
    a plurality of second repair lines among the second set of repair lines, located on a second area outside the display area and substantially opposite to the first repair lines, crossing and being electrically separated from the second conductive lines; and
    a plurality of third repair lines located on a third area outside the display area and the third area different from the first area and the second area, each of the third repair lines being in electrical connection respectively with one of the first repair lines and one of the second repair lines;
    wherein the second conductive lines are divided into a plurality of second conductive line groups and each of the second conductive line groups respectively corresponds to one of the first repair lines, one of the second repair lines, and one of the third repair lines.

2. The active array substrate of claim 1, wherein the widths of the intersections of the first repair lines and the second conductive lines are smaller than the widths of other parts of the first repair lines.

3. The active array substrate of claim 1, wherein the widths of the intersections of the second repair lines and the second conductive lines are smaller than the widths of other parts of the second repair lines.

4. The active array substrate of claim 1, wherein each of the second conductive line groups has the same number of the second conductive lines.

5. The active array substrate of claim 1, wherein each of the third repair lines has a first conductive layer formed on the substrate, an insulating layer covering on the surface of the first conductive layer, a second conductive layer formed on the surface of the insulating layer, and a protecting layer covering on the surface of the second conductive layer.

6. The active array substrate of claim 5, wherein each of the third repair lines has a plurality of conductive units, and the conductive units are respectively in electrical connection with the first conductive layer and the second conductive layer.

7. The active array substrate of claim 1, wherein the number of the third repair lines ranges from 2 to 8.

8. The active array substrate of claim 1, wherein each of the first repair lines has a first conductive layer formed on the substrate and an insulating layer covering on the surface of the first conductive layer.

9. The active array substrate of claim 1, wherein each of the second repair lines has a first conductive layer formed on the substrate and an insulating layer covering on the surface of the first conductive layer.

10. The active array substrate of claim 1, further comprising a plurality of driver chips electrically connected to the second conductive lines respectively, wherein at least one of the third repair lines, extending from the first repair lines, passes through the location between two adjacent driver chips and is electrically connected to the second repair lines.

11. The active array substrate of claim 1, further comprising a plurality of driver chips electrically connected to the second conductive lines respectively, wherein at least one of the third repair lines, extending from the first repair lines, passes through the bottom outside the driver chip and is electrically connected to the second repair lines.

12. The active array substrate of claim 1, wherein each of the third repair lines is in electrical connection with a switching unit disposed adjacent to the first repair line.

13. The active array substrate of claim 1, wherein at least one of the third repair lines from the first repair lines extends to the location between two adjacent second conductive line groups and is electrically connected to the second repair line.

14. The active array substrate of claim 1, wherein at least one of the third repair lines from the first repair lines extends to the second conductive line group and is electrically connected to the second repair line.

15. The active array substrate of claim 1, wherein the flat panel display comprises a liquid crystal display or an organic light emitting diode display.

16. An active array substrate for a flat panel display having a display area between a first set of repair lines and a second set of repair lines, comprising:
   a substrate having a display area;
   a plurality of first conductive lines disposed on the substrate;
   a plurality of second conductive lines, disposed on the substrate, crossing and being electrically separated from the first conductive lines on the display area;
   a plurality of first repair lines among the first set of repair lines, located on a first area outside the display area, crossing and being electrically separated from the second conductive lines;
   a plurality of second repair lines among the second set of repair lines, located on a second area outside the display area and substantially opposite to the first repair lines, crossing and being electrically separated from the second conductive lines; and
   a plurality of third repair lines located on a third area outside the display area and the third area different from the first area and the second area, each of the third repair lines being in electrical connection respectively with one of the first repair lines and one of the second repair lines;
   wherein the second conductive lines are divided into a plurality of second conductive line groups, each of the second conductive line groups comprises a second conductive odd line and a second conductive even line, and each of the second conductive line groups respectively corresponds to one of the first repair lines, one of the second repair lines, and one of the third repair lines;
   wherein the widths of the intersections of the first repair lines and the second conductive lines are smaller than the widths of other parts of the first repair lines, and the intersections of the first repair lines and the second conductive lines are for repair welding, and the widths of the intersections of the second repair lines and the second conductive lines are smaller than the widths of other parts of the second repair lines, and the intersections of the second repair lines and the second conductive lines are for repair welding.

17. An active array substrate for a flat panel display, comprising:
   a substrate having a display area;
   a plurality of first conductive lines disposed on the substrate;
   a plurality of second conductive lines, disposed on the substrate, crossing and being electrically separated from the first conductive lines on the display area;
   a plurality of first repair lines, located on a first area outside the display area, crossing and being electrically separated from the second conductive lines;
   a plurality of second repair lines, located on a second area outside the display area and substantially opposite to the first repair lines, crossing and being electrically separated from the second conductive lines; and
   a plurality of third repair lines located on a third area outside the display area and the third area different from the first area and the second area, each of the third repair lines being in electrical connection respectively with one of the first repair lines and one of the second repair lines;
   wherein the second conductive lines are divided into a plurality of second conductive line groups and each of the second conductive line groups respectively corresponds to one of the first repair lines, one of the second repair lines, and one of the third repair lines;
   wherein the plurality of second conductive line groups do not overlap or intersect each other, and maintain a specific distance between each two adjacent second conductive line groups.

* * * * *